United States Patent
Kirchner et al.

[15] 3,668,362
[45] June 6, 1972

[54] METHODS AND APPARATUS FOR WELDING REINFORCING MEMBERS TO SHADOW MASKS

[72] Inventors: Myron C. Kirchner, Itasca, Ill.; Thomas R. Rosenberger, Milwaukee, Wis.

[73] Assignee: Tubal Industries, Inc., Elk Grove Village, Ill. ; by said Kirchner

[22] Filed: June 22, 1970

[21] Appl. No.: 48,132

[52] U.S. Cl..............................219/87, 219/117, 29/25.11, 29/25.14, 29/25.19
[51] Int. Cl......................................................B23k 11/10
[58] Field of Search................219/87, 158, 160, 117, 115, 219/86; 29/25.19, 25.11, 25.14; 313/85 S

[56] References Cited
UNITED STATES PATENTS 3,309,493  3/1967  Vitale............................29/25.13 X
2,881,334  4/1959  Praeg............................219/115 X
2,468,001  4/1949  Taylor et al.........................219/87

Primary Examiner—J. V. Truhe
Assistant Examiner—J. G. Smith
Attorney—Stryker and Jacobson

[57] ABSTRACT

A method and apparatus for welding reinforcing members to color television shadow masks. Eight internal supporting blocks are positioned by a rotary cam to support the inside concave surface of the mask while welding electrodes press and weld a reinforcing ring to the shadow mask from the outside.

12 Claims, 5 Drawing Figures

PATENTED JUN 6 1972

INVENTORS
MYRON C. KIRCHNER
THOMAS R. ROSENBERGER

BY Stryker & Jacobson
ATTORNEYS

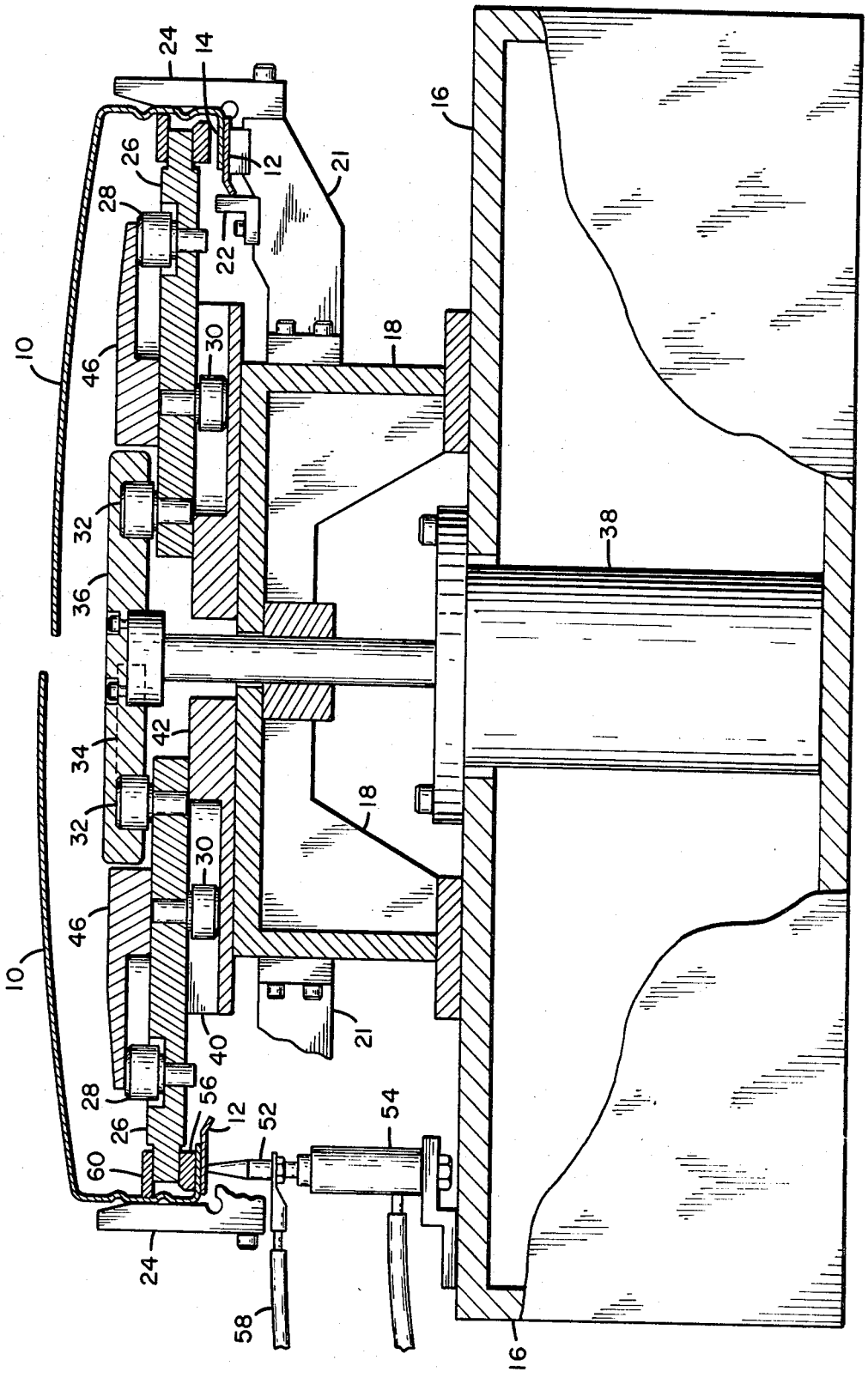

METHODS AND APPARATUS FOR WELDING REINFORCING MEMBERS TO SHADOW MASKS

BACKGROUND OF THE INVENTION

A conventional colored television shadow mask is mounted by means of a heavy mounting frame which serves to stabilize the mask and support it within the picture tube. This manufacturing technique is lengthy and cumbersome and results in an expensive heavy shadow mask assembly. A recent improvement in shadow masks eliminates this heavy mounting frame by shaping the four sides of the shadow mask into a self supporting structure reinforced with a thin ring which is welded to the rear flange of the mask in the manner disclosed in patent application Ser. No. 822,792 by Myron C. Kirchner, and assigned to the same assignee as the instant application. This new type of shadow mask is much less costly, lighter in weight, and is referred to in the industry as a uniframe mask or unimask. The present invention provides a method and apparatus for welding the reinforcing ring to the mask without excessive labor or time consuming processes.

SUMMARY OF THE INVENTION

In the present invention, the mask is placed on the machine face up over the reinforcing ring. A number of supporting fingers extending from the base of the machine hold the reinforcing ring and shadow mask in this juxtaposed or contiguously stacked position. A rotary cam operates to slide eight internal supporting blocks radially outward to the inside surfaces of the shadow mask. In this extended position the eight blocks form a composite working surface inside the shadow mask. Positioned about the periphery of the mask are a number of welding electrodes which may be activated to move upwards pressing the stacked ring and the rear flange of the mask tightly together against the eight internal blocks. The electrodes may be activated together or in a predetermined sequence so as to spot weld the ring to the mask in a number of locations. To permit removal of the finished welded mask and ring assembly, the welding electrodes are lowered and the eight internal support blocks are withdrawn toward the center by the rotary cam. With the machine in this configuration the finished welded assembly may be lifted out of the machine. Thus, it is an object of my invention to provide an automated mechanized means and method for welding reinforcing rings to shadow masks.

Other objects and advantages will become apparent to those skilled in the art upon consideration of the following description and drawings.

BRIEF DESCRIPTION OF THE DRAWINGS

FIG. 2 is a sectional side view of a machine constituting an embodiment of the present invention in which a mask is shown in two different positions on the right and left.

DESCRIPTION OF THE PREFERRED EMBODIMENT

Figure 1:
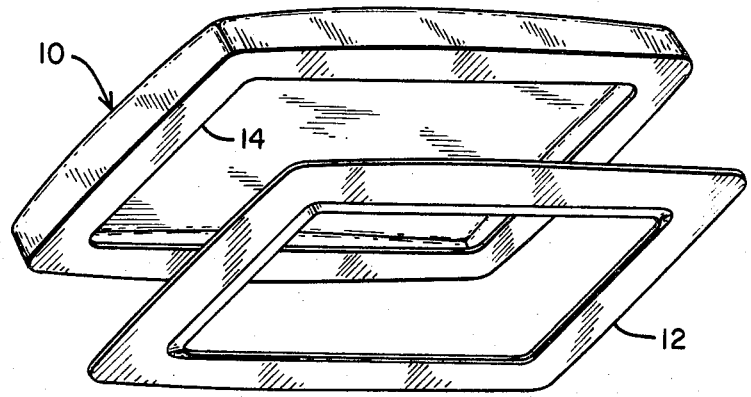
FIG. 1 shows a perspective view of a shadow mask and its reinforcing ring which are to be welded together.

In FIG. 1 a shadow mask 10 is shown together with a reinforcing ring member 12. Reinforcing ring 12 is welded to the bottom of mask 10 directly to a flange 14 on mask 10. This is to provide sufficient reinforcement to mask 10 to eliminate the necessity of a bulky external mounting frame as has been used in the past.

FIG. 2 shows a machine which is used to weld ring 12 to mask 10. A table 16 serves to support a base member 18. Mounted on base 18 are several support members or fingers 21 which have small adjustable blocks 22 and 24 connected to them. Typically there may be as many as twenty of these support members 21 about the periphery of base 18 but for the sake of clarity only two are shown in FIG. 2 and the left one is partly cut away. The support members 21 provide a flat surface upon which reinforcing ring 12 is positioned by the machine's operator. Shadow mask 10 is then juxtaposed just above ring 12. In this embodiment, as shown on the right side of FIG. 2, the mask is placed with its face up and flange 14 resting on ring 12 although other arrangements may be used. Eight internal supporting blocks 26 are utilized to position the sides of shadow mask 10 snugly against adjustable blocks 24 on fingers 21. Each support block 26 has small adjustable blocks 56 and 60 at its tip which will be discussed in detail later. In addition, each support block 26 has three guide post and roller assemblies 28, 30 and 32. Each of the guide post and roller assemblies 32 engages a spiral groove 34 in a rotary cam 36. This may be better seen in FIG. 3. An air cylinder 38 operates to rotate cam 36 so as to move roller assemblies 32 outward and thereby move internal support blocks 26 outward to the inside surfaces of the shadow mask 10. To insure that internal support blocks 26 move to the proper positions, there are eight guide slots above and eight slots below blocks 26 which accept post and roller assemblies 30 and 28. Eight generally radial slots 40 are machined into a guide bed 42 which rests on top of base member 18. Although these slots are generally radial, reference to FIG. 3 will show that they are not exactly radial. An additional eight overhead guide slots 44 are provided in a guide block 46 which is mounted above blocks 26 by means of several supporting posts 50 which are more readily visible in FIGS. 3 and 4.

Figure 3:
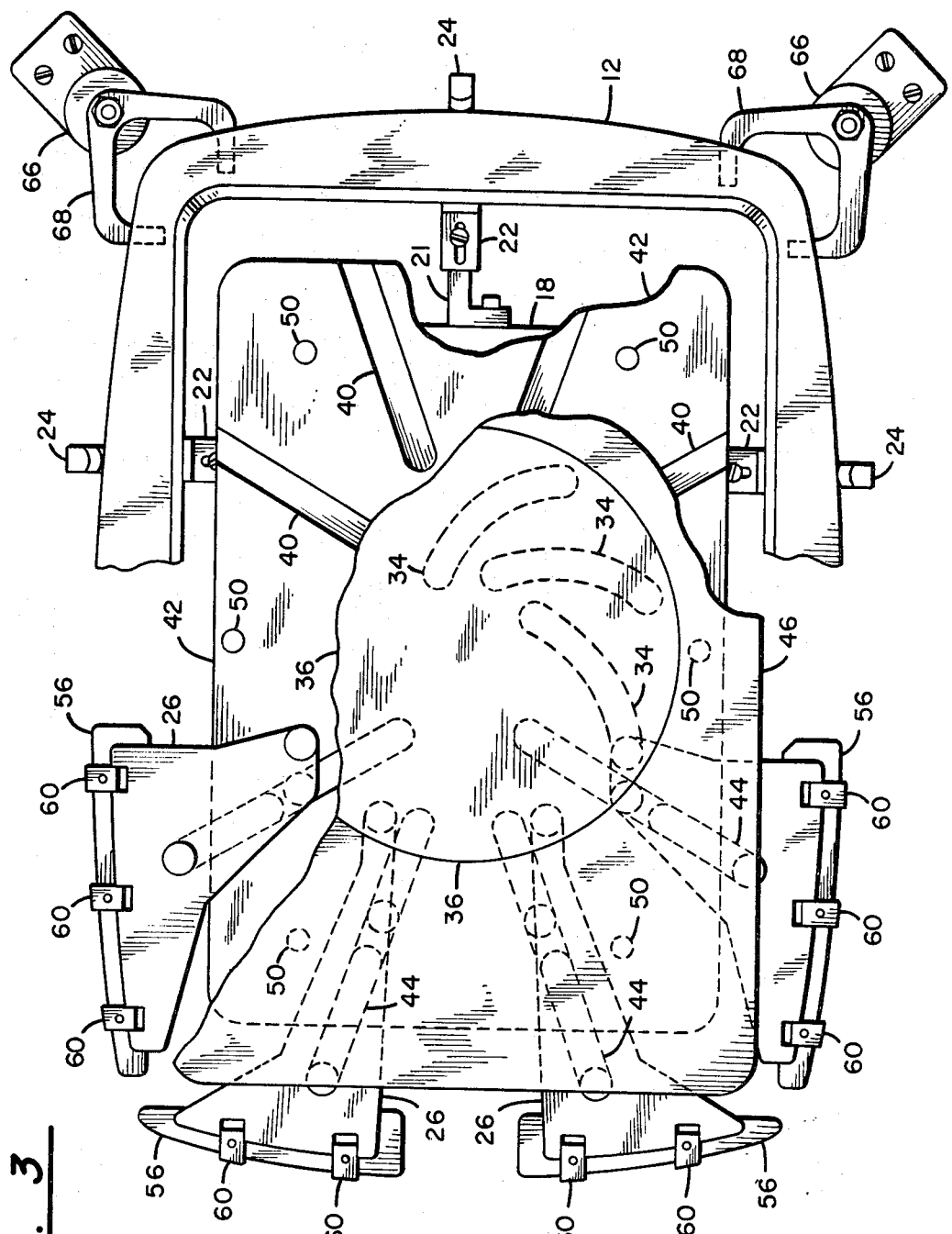
FIG. 3 is a partially cut away top view of the machine with the internal supporting blocks in the expanded position.

In FIG. 3 it may be seen that guide block 46 is supported on guide bed 42 by means of vertical posts 50. Guide bed 42 and guide block 46 thus provide slots below and above blocks 26 which accept post and roller assemblies 28 and 30. This insures that blocks 26 reach their proper peripheral positions for supporting shadow mask 10. Also readily visible in FIG. 3 are three of the eight spiral grooves 34 in cam 36 which engage post and roller assemblies 32 so as to move blocks 26 in and out. The remaining five grooves 34 are not shown for the purposes of clarity. Only four of the support blocks 26 are shown in FIG. 3. Roughly half of guide block 46 and part of cam 36 have been cut away in FIG. 3 to better show guide bed 42. Also a portion of guide bed 42 has been cut away in order to better show how the finger support members 21 are mounted to base member 18. Approximately one half of the reinforcing ring 12 is shown on the right supported by three of the finger members 21.

Referring again to FIG. 2, part of the finger support member 21 has been cut away on the left to better show one of the welding electrodes. A welding electrode 52 is mounted on an air cylinder 54 which in turn is mounted to table 16. Once blocks 26 have positioned the screen correctly against adjustable blocks 24 on finger supports 21 as shown on the right side of FIG. 2, a number of air cylinders 54 move corresponding electrodes 52 upwards against ring 12, pushing it against flange 14 of shadow mask 10 which is against adjustable block 56 mounted at the tip of block 26. Typically there may be as many as 48 electrodes. In this compressed position, the electrodes 52 are energized by bringing current to them through a suitable electrical conductor 58. The current is caused to be of sufficient magnitude and duration to insure strong spot weld between ring 12 and mask 10 at the various electrode locations. Blocks 56 and 26 operate in conjunction with the rest of the machine members as electrical grounding members for electrodes 52. Blocks 56 are adjustable along with small adjustable tabs 60. Blocks 56 and tabs 60 are used to achieve precise final location of shadow mask 10 in the event of small discrepancies in the position of blocks 26.

Referring again to FIG. 3, air cylinders 66 are shown mounted on table 16 which move positioning arms 68 up underneath ring 12 before the welding operation so as to insure the proper positioning of ring 12 against flange 14 of shadow mask 10. To simplify the drawing, only two air cylinders 66 are shown in FIG. 3, and ring 12 is cut away so as to be seen only on the right hand side of FIG. 3. Typically four air cylinders 66 and four positioning arms 68 are utilized in the preferred embodiment, one at each corner of ring 12.

Figure 4:
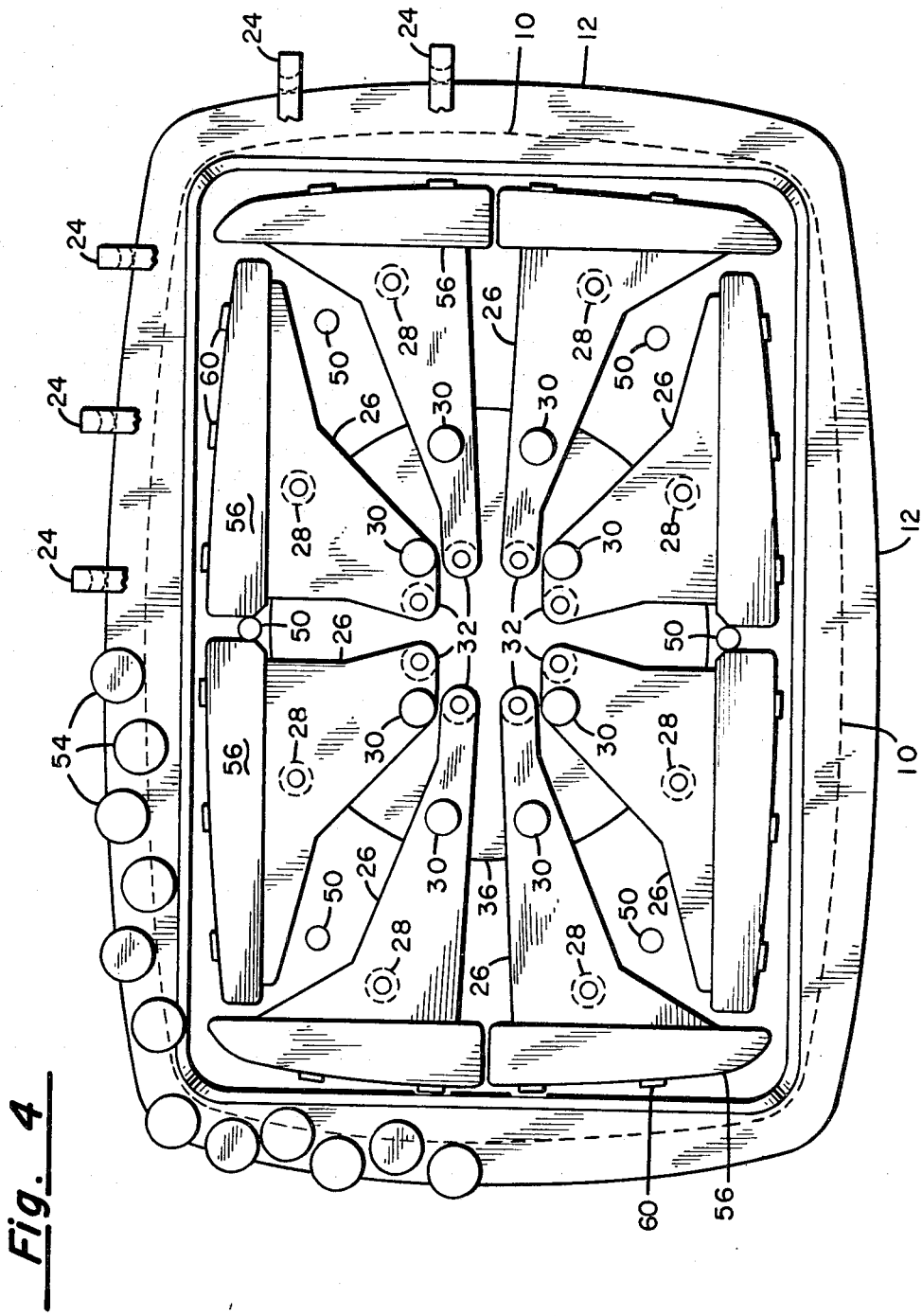
FIG. 4 is a locational diagram of the apparatus of FIG. 3 as viewed from the bottom indicating the position of the internal blocks when withdrawn and the location of the welds.

Referring to FIG. 4, the locations of several of the components are indicated when the eight internal supporting blocks 26 are in their withdrawn position. Since FIG. 4 is a locational diagram as seen from the bottom of FIG. 3, blocks 56 are more readily visible then in the other figures. Also, 12 spot weld locations are indicated by the showing of twelve of the air cylinders 54 which carry the electrodes for making the 12 welds. For the purposes of clarity, the other weld locations in the other three quadrants are not shown although they are generally symmetrically located with those that are shown in the upper left quadrant of FIG. 4. In the same manner, five of the supporting fingers 21 and adjustable blocks 24 are shown in the upper right quadrant to more clearly show their positions for supporting the entire ring 12 and shadow mask 10.

Figure 5:
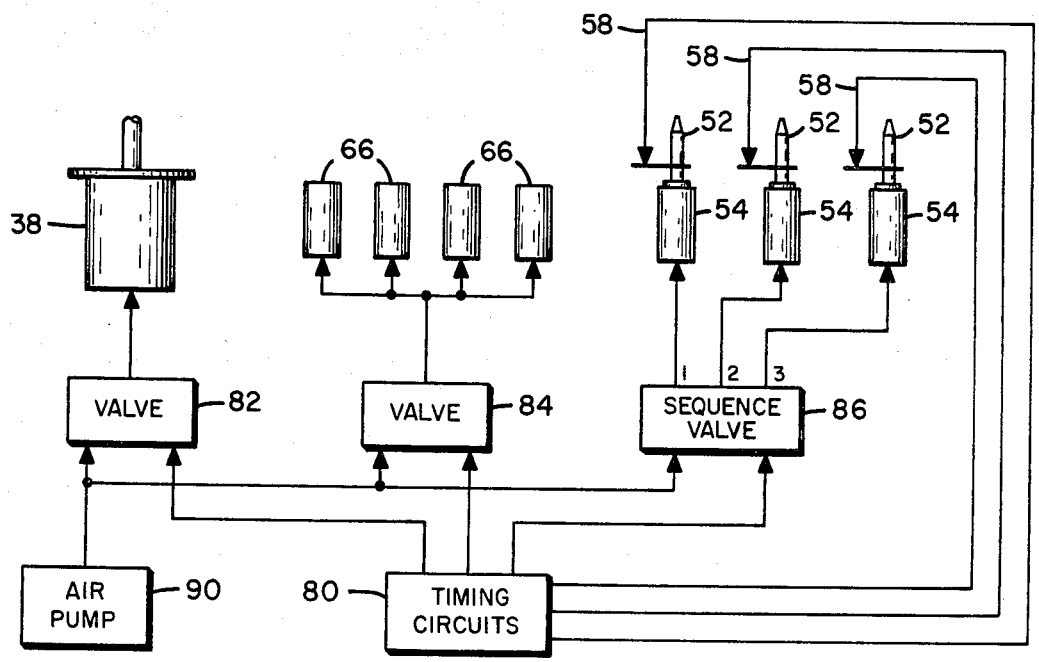
FIG. 5 shows a circuit which may be used for controlling the various operations of the apparatus.

In FIG. 5 a circuit is shown which may be used for activating each of the air cylinders in their proper sequence. A timing circuit 80 operates to open a valve 82 which first activates air cylinder 38 so as to rotate cam 36 and expand the internal support blocks 26 into position inside the shadow mask. Timing circuit 80 then activates a valve 84 which serves to operate four air cylinders 66 positioned at the corners of the shadow mask so as to raise ring 12 and shadow mask 10 tightly against blocks 56. Timing circuit 80 then activates a sequence valve 86 which activates the air cylinders 54 so as to raise welding electrodes 52 into position against ring 12 and shadow mask 10. Three valves 54 are shown in FIG. 5 to indicate that only one-third of the electrodes are raised at a time in the preferred embodiment so that less current is consumed at one time during the welding operation. Sequence valve 86 sequentially raises a different third of the electrodes each time. Timing circuit 80 controls the delivery of welding current to the proper set of electrodes as each is brought into position against ring 12. An air pump 90 supplies air to each of the three air valves 82, 84 and 86. Clearly, the circuit of FIG. 5 is only one possible arrangement for activating the apparatus of the present invention. An alternative method might be to activate each of the different air cylinders individually by a manual control or the like. Since such variations are possible, I do not intend to be bound by the particular embodiment shown and described except as defined by the appended claims.

We claim:

1. A method of attaching reinforcement members to shadow masks which shadow masks are generally rectangular in shape having first and second generally parallel end walls extending generally perpendicular from the ends of the face of the mask and first and second generally parallel side walls extending generally perpendicular from the sides of the face of the mask and generally perpendicular to the end walls comprising the steps of moving supports which together form a generally rectangular shape matching the interior shape of the walls of the mask against the side and end walls of said mask so as to firmly hold all portions of the mask in predetermined position, juxtaposing the reinforcing member to the walls of the mask, pressing the reinforcing member to the mask with a set of welding electrodes, and activating the electrodes so as to weld the member to the masks.

2. The method of claim 1 in which said pressing and activating steps comprise a plurality of separate pressing and activating steps spaced in time, each of said plurality of steps utilizing separate sets of electrodes.

3. The method of claim 1 wherein the mask is juxtaposed to the reinforcing members by placing it so that its rear flange is in contact with the reinforcing member by initially placing the reinforcing member flat on supporting fingers and then placing the mask so that the flange rests against the reinforcing member.

4. The method of claim 3 wherein the mask is also physically supported by being held between internal and external supports around its periphery.

5. The method of claim 4 including the step of pressing the reinforcing member to the mask at the corners of the mask before pressing with the sets of electrodes.

6. Apparatus for welding a reinforcing member to a shadow mask which shadow mask is generally rectangular in shape having first and second generally parallel end walls extending generally perpendicular from the ends of the face of the mask and first and second generally parallel side walls extending generally perpendicular from the sides of the face of the mask and generally perpendicular to the end walls comprising:
a base member;
external locating means for holding the reinforcing member and the shadow mask in juxtaposition;
internal positioning members located within an area bound by said external means which together have a shape approximating the inside shapes of the end and side walls against each of the end walls and side walls of the shadow mask and hold the sides in a suitable generally rectangular position for welding;
locating means having cam means operable to move said internal means outwardly toward the external means;
welding means mounted on said base member;
actuating means operable to move said welding means against said reinforcing member so as to position said reinforcing member in contact with said shadow mask; and
activating means operable to energize said welding means upon reaching said contact position for welding the reinforcing member to the shadow mask.

7. The apparatus of claim 6 in which said internal locating means comprises a plurality of internal positioning members having a shape conforming to the inside surface shape of the mask; and means for moving said internal positioning members along generally radial paths relative to said base into the sides of said mask.

8. The apparatus of claim 7 in which said external locating means comprise supporting members attached to said base member and having a shape adapted to conform to the external perimeters of the shadow mask and the reinforcing member so as to support both the mask and the reinforcing member.

9. The apparatus of claim 8 in which said actuating means comprise air cylinders mounted on said base and adapted to move the electrodes of said welding means so as to compress said reinforcing member and said mask against said internal locating means.

10. The apparatus of claim 9 in which said means for moving the internal positioning members comprises a rotary cam having a plurality of spiral grooves and means for engaging each groove with one of said internal positioning members.

11. The apparatus of claim 10 further including guide slots in said base member disposed above and below said internal positioning members for engaging and guiding said internal positioning members along said generally radial paths.

12. The apparatus of claim 11 further including means for securely holding the reinforcing member against the mask at the corners of the mask.

* * * * *